US012566586B2

(12) United States Patent
Luo et al.

(10) Patent No.: US 12,566,586 B2
(45) Date of Patent: Mar. 3, 2026

(54) HIGH-SPEED QUANTUM RANDOM NUMBER GENERATOR BASED ON VACUUM STATE FLUCTUATION TECHNOLOGY

(71) Applicant: SHRONG ENERGY TECHNOLOGY CO., LTD., Beijing (CN)

(72) Inventors: Huilin Luo, Beijing (CN); Qiechun Chen, Beijing (CN)

(73) Assignee: SHRONG ENERGY TECHNOLOGY CO., LTD., Beijing (CN)

( * ) Notice: Subject to any disclaimer, the term of this patent is extended or adjusted under 35 U.S.C. 154(b) by 1008 days.

(21) Appl. No.: 17/765,495

(22) PCT Filed: May 31, 2021

(86) PCT No.: PCT/CN2021/097442
§ 371 (c)(1),
(2) Date: Mar. 31, 2022

(87) PCT Pub. No.: WO2021/244491
PCT Pub. Date: Dec. 9, 2021

(65) Prior Publication Data
US 2022/0308839 A1     Sep. 29, 2022

(30) Foreign Application Priority Data
Jun. 3, 2020    (CN) .......................... 202010492758.7

(51) Int. Cl.
*G06F 7/58* (2006.01)
*G06N 10/00* (2022.01)

(52) U.S. Cl.
CPC ............. *G06F 7/588* (2013.01); *G06N 10/00* (2019.01)

(58) Field of Classification Search
CPC ......... G06F 7/58; G06F 7/588; H04L 9/0852; H04L 9/0869; G06N 10/00; G06N 10/20
See application file for complete search history.

(56) References Cited

U.S. PATENT DOCUMENTS

| | | |
|---|---|---|
| 2014/0337400 A1 | 11/2014 | Chong et al. |
| 2019/0050203 A1 | 2/2019 | Qi |
| 2020/0125332 A1* | 4/2020 | Pooser ...................... G06F 7/58 |

FOREIGN PATENT DOCUMENTS

| | | |
|---|---|---|
| CN | 108491185 A | 9/2018 |
| CN | 108563422 A | 9/2018 |

(Continued)

OTHER PUBLICATIONS

Grice Quantum secret sharing with polarization-entangled photon pairs Phys. Rev. A 99, 062311 Published Jun. 11, 2019 DOI: https://doi.org/10.1103/PhysRevA.99.062311 (Year: 2019).*

(Continued)

*Primary Examiner* — James Trujillo
*Assistant Examiner* — Jakob Oscar Gudas
(74) *Attorney, Agent, or Firm* — ANOVA LAW GROUP, PLLC

(57) ABSTRACT

A high-speed quantum random number generator includes a laser light source, an unequal proportion optical splitter configured split a laser signal emitted by the laser light source into n first light beams and n second light beams, n differential detectors, n amplifiers, n analog-to-digital converters, and a programmable logic device. Input ends of each of the differential detectors is coupled to the unequal proportion optical splitter and configured to receive one of the first light beams and one of the second light beams. An input end of each of the amplifiers is coupled to an output end of a corresponding one of the differential detectors. An input end of each of the analog-to-digital converters is coupled to an output end of a corresponding one of the amplifiers. An (Continued)

output end of each of the analog-to-digital converters is connected to an input end of the programmable logic device.

6 Claims, 1 Drawing Sheet

(56)                References Cited

FOREIGN PATENT DOCUMENTS

| | | | | |
|----|------------------|-----|---------|-------------|
| CN | 208547936   U | 2/2019 | | |
| CN | 209433389   U | 9/2019 | | |
| CN | 111488993   A | 8/2020 | | |
| EP | 3040853   B1 * | 12/2018 | ............. | G06F 7/588 |
| WO | WO-2020156561   A1 * | 8/2020 | ........... | H04L 9/0852 |

OTHER PUBLICATIONS

Grice et al. "Quantum secret sharing using weak coherent states" Phys. Rev. A 100, 022339—Published Aug. 28, 2019 DOI: https://doi.org/10.1103/PhysRevA.100.022339 (Year: 2019).*

The World Intellectual Property Organization (WIPO) International Search Report for PCT/CN2021/097442 Sep. 1, 2021 4 Pages (with translation).

The European Patent Office (EPO) The Extended Search Report for EP Application No. 21817707.9 Oct. 20, 2023 8 Pages.

T. Symul, S. M. Assad, P. K. Lam, Real time demonstration of high bitrate quantum random number generation with coherent laser light, Quantum Physics, 98, 231103, 2011, pp. 1-3.

Ziyong Zheng, Yi-Chen Zhang, Song Yu, Hong Guo, Experimental implementation of bias-free quantum random number generator based on vacuum fluctuation, Quantum Physics, Apr. 23, 2019, pp. 1-6.

* cited by examiner

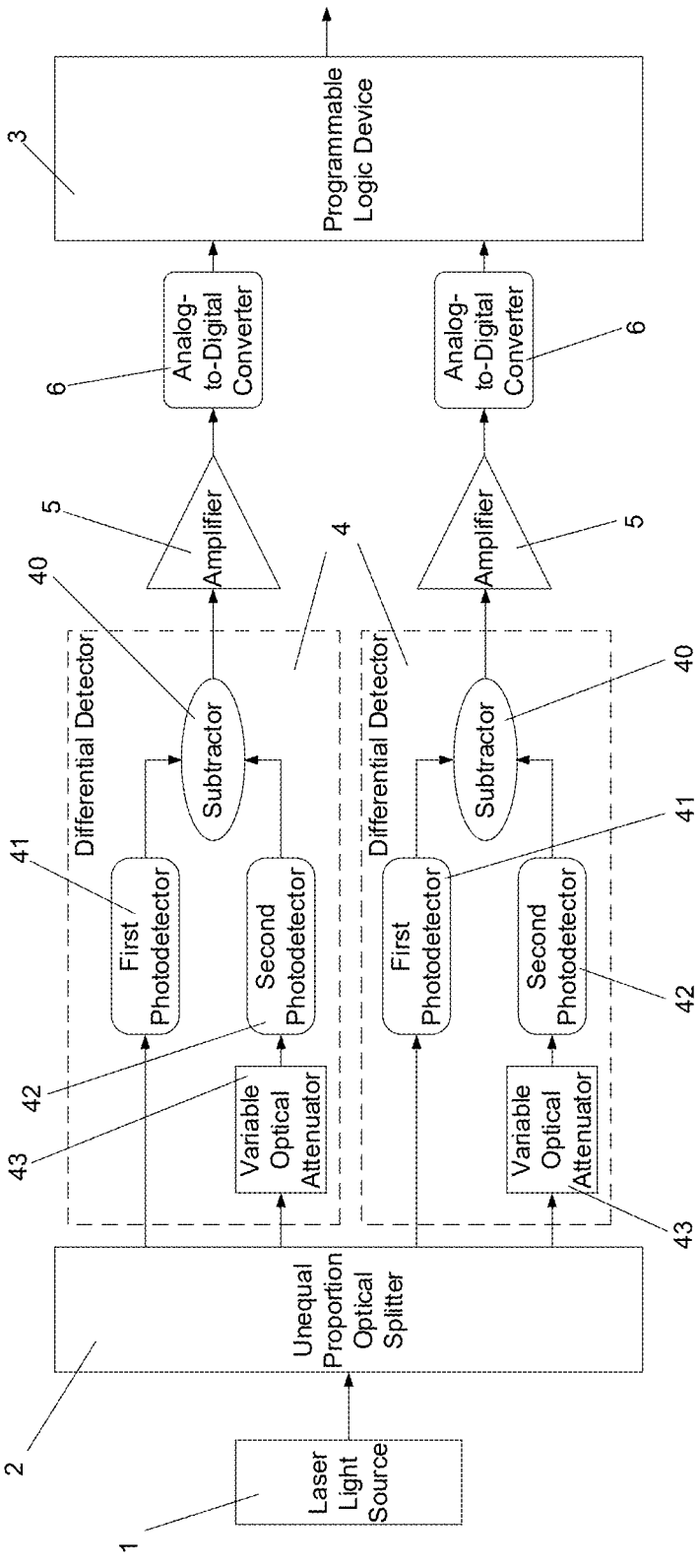

HIGH-SPEED QUANTUM RANDOM NUMBER GENERATOR BASED ON VACUUM STATE FLUCTUATION TECHNOLOGY

CROSS-REFERENCE TO RELATED APPLICATIONS

The present disclosure is a national stage entry under 35 U.S.C. § 371 of International Application No. PCT/CN2021/097442, filed on May 31, 2021, which claims the priority to Chinese Patent Application No. 202010492758.7, filed with the China National Intellectual Property Administration (CNIPA) on Jun. 3, 2020, and entitled "HIGH-SPEED QUANTUM RANDOM NUMBER GENERATOR BASED ON VACUUM STATE FLUCTUATION TECHNOLOGY," which are incorporated herein by reference in their entirety.

TECHNICAL FIELD

The present disclosure relates to, but is not limited to, a high-speed quantum random number generator based on vacuum state fluctuation technology.

BACKGROUND

With the rapid development of social informatization, there is a higher requirement on convenience and security of information. Encryption technology is an important part of information security. Quantum technology, which is well recognized as capable of generating a real random number, has gained wide attention and gradually become commercially available. A basic principle of vacuum state fluctuation technology is that: in quantum optics, orthogonal components of amplitude and phase of a vacuum state in a phase space cannot be precisely detected simultaneously.

SUMMARY

An overview of the subject matter detailed in the present disclosure is provided below, which is not intended to limit the protection scope of the claims.

The present disclosure provides a high-speed quantum random number generator based on vacuum state fluctuation technology. The high-speed quantum random number generator includes a laser light source, an unequal proportion optical splitter, a programmable logic device, n differential detectors, and n groups of amplifier and analog-to-digital converter connected sequentially. A laser signal emitted by the laser light source is divided into n first light beams and n second light beams by the unequal proportion optical splitter, wherein n is an integer greater than or equal to 2. Each of the first light beams and one corresponding second light beam are input to input ends of one of the differential detectors. An output end of each of the differential detectors is correspondingly connected to an input end of one of the amplifiers. An output end of the analog-to-digital converter is connected to an input end of the programmable logic device.

The differential detector includes a subtractor, and a first photodetector and a second photodetector arranged in parallel. A variable optical attenuator is disposed at an input end of the second photodetector. The first light beam and the second light beam are respectively input to the first photodetector and the variable optical attenuator. An output end of the first photodetector and an output end of the second photodetector are both connected to input ends of the subtractor. An output end of the subtractor is connected to an input end of the amplifier.

A light intensity of the first light beam is less than a light intensity of the second light beam.

When n=2, the first light beam is 10%, 15%, or 20% of the laser signal, and the second light beam is 40%, 35%, or 30% of the laser signal. When n=3, the first light beam is 1/9 of the laser signal, and the light second beam is 2/9 of the laser signal.

The high-speed quantum random number generator based on vacuum state fluctuation technology according to embodiments of the present disclosure can achieve the following beneficial effects.

According to the high-speed quantum random number generator in the present disclosure, the laser signal, after being unequally divided, is input to at least two differential detectors for differentiation, and then subject to amplification and filtering, and after combination, a high-speed digital random number is obtained. The high-speed quantum random number generator can effectively cancel electrical noises, reduce the number of adjustable components, save space, and reduce debugging process. Therefore, product reliability and production efficiency are improved.

BRIEF DESCRIPTION OF THE DRAWING

The drawing incorporated into the specification and constituting part of the specification illustrates the embodiments of the present disclosure, and is used together with the description to explain the principles of the embodiments of the present disclosure. In these drawings, similar reference numerals are used to represent similar elements. The drawing in the following description is one rather than all of the embodiments of the present disclosure. Those skilled in the art may derive other drawings based on the drawing without creative efforts.

FIG. 1 exemplifies a schematic diagram of a high-speed quantum random number generator according to an embodiment of the present disclosure.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by those skilled in the art based on the embodiments of the present disclosure without creative efforts should fall within the scope of the present disclosure. It should be noted that the embodiments in the present disclosure and features in the embodiments may be combined with each other when there is no conflict.

In the present disclosure, an unequal proportion optical splitter is configured to split a laser signal of a laser light source into multiple relatively strong light beam signals and multiple relatively weak light beam signals. First, differentiation is performed on the relatively weak light beam signals and signals obtained by performing attenuation adjustment on the relatively strong light beam signals. Then, amplification is performed on obtained signals. Finally, analog-to-digital conversion is performed on amplified signals. Multiple analog-to-digital conversion signals obtained after being split and based on the foregoing processing are input into a programmable logic device, so as to form a high-speed digital random number, that is, a high-speed quantum random number signal.

With reference to the accompanying drawing, the following describes in detail a high-speed quantum random number generator based on vacuum state fluctuation technology provided in the present disclosure.

FIG. 1 shows a schematic diagram of a specific embodiment of a high-speed quantum random number generator according to the present disclosure. Referring to FIG. 1, the high-speed quantum random number generator includes a laser light source 1, an unequal proportion optical splitter 2, a programmable logic device 3, n differential detectors 4, and n groups of amplifier 5 and analog-to-digital converter 6 connected sequentially. A laser signal emitted by the laser light source 1 is divided into n first light beams and n second light beams by the unequal proportion optical splitter 2. A light intensity of the first light beam is different from that of the second light beam, wherein n is an integer greater than or equal to 2. For example, in the embodiment shown in FIG. 1, n=2. Since generation of a quantum noise requires high stability of a laser light source, costs of the laser light source are high. Therefore, in this solution, one laser light source 1 is used, and the laser signal is divided by the unequal proportion optical splitter 2 for detecting. This effectively reduces product costs and improves product reliability.

In the high-speed quantum random number generator, each of the first light beams and one corresponding second light beam are input to input ends of one of the differential detectors 4. An output end of each of the differential detectors 4 is correspondingly connected to an input end of the amplifier 5. An output end of the analog-to-digital converter 6 is connected to an input end of the programmable logic device 3. After separately detecting signals of the first light beam and the second light beam, the differential detector 4 obtains a difference. Then, the amplifier 5 amplifies the difference and transmits an amplified difference to the analog-to-digital converter 6 for analog-to-digital conversion. After that, signals obtained after the analog-to-digital conversion are delivered to the programmable logic device 3. The programmable logic device 3 performs filtering processing on the signals obtained after the analog-to-digital conversion, filters out residual electrical noises, and combines obtained signals into one signal, so as to obtain a high-speed digital random number signal, that is, a high-speed quantum random number signal. The analog-to-digital converter 6 may double a generation rate of a random number, and ensure that random noises in n signals are uncorrelated.

In this embodiment, the differential detector 4 includes a subtractor 40, and a first photodetector 41 and a second photodetector 42 arranged in parallel. An output end of the first photodetector 41 and an output end of the second photodetector 42 are both connected to input ends of the subtractor 40. An output end of the subtractor 40 is connected to an input end of the amplifier 5. The first photodetector 41 and the second photodetector 42 are respectively configured to perform photoelectric conversion on the first light beam and the second light beam, to convert an optical signal into an electrical signal. Then, the subtractor 40 obtains a difference between the two signals and outputs the difference to the amplifier 5 for amplification processing. A variable optical attenuator 43 is disposed at an input end of the second photodetector 42. In other words, a light intensity of a light beam entering the first photodetector 41 is different from that of a light beam entering the second photodetector 42. Preferably, the light intensity of a light beam entering the first photodetector 41 is weaker than a light intensity of a light beam entering the variable optical attenuator 43. For example, if a light intensity of the first light beam is weaker than a light intensity of the second light beam, the first light beam is input to the first photodetector 41, and the second light beam is input to the variable optical attenuator 43. The second light beam is attenuated by the variable optical attenuator 43 and then enters the second photodetector 42.

For example, when n=2, the first light beam may be 10%, 15%, or 20% of the laser signal, and the second light beam may be 40%, 35%, or 30% of the laser signal, or when n=3, the first light beam is ⅓ of the laser signal, and the second light beam is ⅔ of the laser signal.

For example, the laser light source 1 outputs a laser signal with optical power of P. The unequal proportion optical splitter 2 divides the laser signal into four light beams: two first light beams with optical power of 0.1P and two second light beams with optical power of 0.4P; or two first light beams with optical power of 0.2P and two second light beams with optical power of 0.3P.

The high-speed quantum random number generator based on vacuum state fluctuation technology according to embodiments of the present disclosure can realize the following beneficial effects.

According to the high-speed quantum random number generator in the present disclosure, the laser signal, after being unequally divided, is input to at least two differential detectors for differentiation, and then subject to amplification and filtering, and after combination, a high-speed digital random number is obtained. The high-speed quantum random number generator can effectively cancel electrical noises, reduce the number of adjustable components, save space, and reduce debugging process. Therefore, product reliability and production efficiency are improved.

In the specification, the terms "include," "comprise," or any other variations thereof are intended to cover a non-exclusive inclusion, so that an article or a device including a series of elements not only includes those elements, but also includes other elements that are not explicitly listed, or also includes inherent elements of the article or the device. Without more restrictions, an element associated with phrase "including a . . . " does not exclude the existence of other identical elements in the article or device including the element.

Those skilled in the art may easily figure out other implementations of the present disclosure after considering the specification and practicing the present disclosure. This application is intended to cover any variations, purposes or adaptive changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the appended claims.

It should be noted that, the present disclosure is not limited to the precise structures that have been described above and shown in the accompanying drawings, and can be modified and changed in many ways without departing from the scope of the present disclosure. The scope of the present disclosure is defined by the appended claims.

INDUSTRIAL APPLICABILITY

The present disclosure provides a high-speed quantum random number generator based on vacuum state fluctuation technology. An unequal proportion optical splitter splits a laser signal of a laser light source into multiple relatively strong light beam signals and multiple relatively weak light beam signals. This effectively reduces product costs and improves product reliability. First, differentiation is performed on the relatively weak light beam signals and signals obtained by performing attenuation adjustment on the relatively strong light beam signals. Then, amplification is performed on obtained signals. Finally, analog-to-digital conversion is performed on amplified signals. Multiple analog-to-digital conversion signals obtained after being split and the foregoing processing are input into a programmable logic device, so as to form a high-speed digital random number, that is, a high-speed quantum random number signal. This can effectively cancel electrical noises, reduce an adjustable component, save space, and reduce a debugging process. Therefore, product reliability and production efficiency are improved.

The invention claimed is:

1. A high-speed quantum random number generator comprising:

a laser light source;

an unequal proportion optical splitter configured to split a laser signal emitted by the laser light source into n first light beams and n second light beams, n being an integer;

n differential detectors, input ends of each of the differential detectors being coupled to the unequal proportion optical splitter and configured to receive one of the first light beams and one of the second light beams;

n amplifiers, an input end of each of the amplifiers being coupled to an output end of a corresponding one of the differential detectors;

n analog-to-digital converters, an input end of each of the analog-to-digital converters being coupled to an output end of a corresponding one of the amplifiers; and a programmable logic device, an output end of each of the analog-to-digital converters is connected to an input end of the programmable logic device;

wherein:

n=2;

a light intensity of each of the first light beams is 10%, 15%, or 20% of a light intensity of the laser signal; and a light intensity of each of the second light beams is 40%, 35%, or 30% of the light intensity of the laser signal.

2. The high-speed quantum random number generator according to claim 1, wherein each of the differential detectors includes:

a subtractor, an output end of the subtractor being coupled to the input end of a corresponding one of the amplifiers;

a first photodetector and a second photodetector arranged in parallel, an output end of each of the first photodetector and the second photodetector being coupled to an input end of the subtractor, and the first photodetector being configured to receive a corresponding one of the first light beams; and a variable optical attenuator disposed at an input end of the second photodetector and configured to receive a corresponding one of the second light beams.

3. The high-speed quantum random number generator according to claim 1, wherein a light intensity of each of the first light beams is less than a light intensity of a corresponding one of the second light beams.

4. A high-speed quantum random number generator comprising:

a laser light source;

an unequal proportion optical splitter configured to split a laser signal emitted by the laser light source into n first light beams and n second light beams, n being an integer;

n differential detectors, input ends of each of the differential detectors being coupled to the unequal proportion optical splitter and configured to receive one of the first light beams and one of the second light beams;

n amplifiers, an input end of each of the amplifiers being coupled to an output end of a corresponding one of the differential detectors;

n analog-to-digital converters, an input end of each of the analog-to-digital converters being coupled to an output end of a corresponding one of the amplifiers; and a programmable logic device, an output end of each of the analog-to-digital converters is connected to an input end of the programmable logic device;

wherein:

n=3;

a light intensity of each of the first light beams is $\frac{1}{9}$ of a light intensity of the laser signal; and a light intensity of each of the second light beams is $\frac{2}{9}$ of the light intensity of the laser signal.

5. The high-speed quantum random number generator according to claim 4, wherein each of the differential detectors includes:

a subtractor, an output end of the subtractor being coupled to the input end of a corresponding one of the amplifiers;

a first photodetector and a second photodetector arranged in parallel, an output end of each of the first photodetector and the second photodetector being coupled to an input end of the subtractor, and the first photodetector being configured to receive a corresponding one of the first light beams; and a variable optical attenuator disposed at an input end of the second photodetector and configured to receive a corresponding one of the second light beams.

6. The high-speed quantum random number generator according to claim 4, wherein a light intensity of each of the first light beams is less than a light intensity of a corresponding one of the second light beams.

* * * * *